(12) United States Patent
Lin

(10) Patent No.: US 7,480,865 B2
(45) Date of Patent: Jan. 20, 2009

(54) AUXILIARY OPERATION INTERFACE OF DIGITAL RECORDING AND REPRODUCING APPARATUS

(75) Inventor: Chia-Hsiang Lin, Hsinchu (TW)

(73) Assignee: Lite-On It Corp., Taipei (TW)

( * ) Notice: Subject to any disclaimer, the term of this patent is extended or adjusted under 35 U.S.C. 154(b) by 538 days.

(21) Appl. No.: 11/254,978

(22) Filed: Oct. 20, 2005

(65) Prior Publication Data

US 2006/0087938 A1    Apr. 27, 2006

(30) Foreign Application Priority Data

Oct. 22, 2004   (TW) .............................. 93132233 A

(51) Int. Cl.
*G06F 3/16* (2006.01)
(52) U.S. Cl. ................. 715/727; 715/728; 715/865; 704/271; 704/275
(58) Field of Classification Search ............. 715/727
See application file for complete search history.

(56) References Cited

U.S. PATENT DOCUMENTS

| | | | | |
|---|---|---|---|---|
| 6,012,030 A | * | 1/2000 | French-St. George et al. | 704/275 |
| 6,249,764 B1 | * | 6/2001 | Kamae et al. | 704/270.1 |
| 6,624,803 B1 | * | 9/2003 | Vanderheiden et al. | 345/156 |
| 6,631,350 B1 | * | 10/2003 | Celi et al. | 704/270 |
| 6,697,781 B1 | * | 2/2004 | Sahlberg | 704/260 |
| 6,748,361 B1 | * | 6/2004 | Comerford et al. | 704/275 |
| 7,280,097 B2 | * | 10/2007 | Chen et al. | 345/156 |
| 7,324,947 B2 | * | 1/2008 | Jordan et al. | 704/275 |
| 2002/0163543 A1 | * | 11/2002 | Oshikiri | 345/810 |
| 2003/0020760 A1 | * | 1/2003 | Takatsu et al. | 345/810 |
| 2003/0139932 A1 | * | 7/2003 | Shao et al. | 704/275 |
| 2005/0015254 A1 | * | 1/2005 | Beaman | 704/270.1 |
| 2005/0125235 A1 | * | 6/2005 | Lazay et al. | 704/275 |

OTHER PUBLICATIONS

Lin, Chia-Hsiang, U.S. Appl. No. 11/255,058, filed Oct. 20, 2005.
Lin, Chia-Hsiang, U.S. Appl. No. 11/254,979, filed Oct. 20, 2005.

* cited by examiner

*Primary Examiner*—Tadesse Hailu
*Assistant Examiner*—Alvin H Tan
(74) *Attorney, Agent, or Firm*—Kirton & McConkie; Evan R. Witt

(57) ABSTRACT

An auxiliary operation interface of a digital recording/reproducing apparatus includes a targeting item, a switching button set and an audio prompt generator. The targeting item is optionally triggered to have the digital recording/reproducing apparatus execute a selected function. The audio prompt generator is enabled to generate an audio prompt when the targeting item is triggered. The audio prompt generator is optionally enabled or disabled by an operation of the switching button set.

13 Claims, 10 Drawing Sheets

AUXILIARY OPERATION INTERFACE OF DIGITAL RECORDING AND REPRODUCING APPARATUS

FIELD OF THE INVENTION

The present invention relates to an auxiliary operation interface, and more particularly to an auxiliary operation interface and a method for facilitating a user to operate a digital recording/reproducing apparatus.

BACKGROUND OF THE INVENTION

Referring to FIG. 1, a functional block diagram of a typical digital recording/reproducing apparatus is shown. A digital recording/reproducing apparatus 10, for example a DVD recorder, is used to record video data into a recordable disc or reproduce video data from a readable disc. Nowadays, the digital recording/reproducing apparatus 10 can be used with various kinds of electrical appliances to record video data from various sources. For example, the analog video signals received from the TV tuner 11 are transmitted to the control circuit 16 to be converted into digital data in a specified format such as MPEG. The digital data in the MPEG format are then recorded into a recordable disc 15 loaded in the disc burner 17 of the DVD recorder 10. Likewise, the analog video signals received from the video cassette recorder (VCR) 12, the DVD player 13, or the digital video signals received from the digital video (DV) camera 14 can also be converted into digital data in a specified format such as MPEG by the control circuit 16 to be recorded into the recordable disc 15.

Referring to FIG. 2, a functional block diagram of another digital recording/reproducing apparatus is shown. The digital recording/reproducing apparatus 100 comprises a disc burner 102, a control circuit 106 and a digital data storage device such as a hard disc drive 101. The signals received from the TV tuner 11, the VCR 12, the DVD player 13, or the DV camera 14 are firstly converted into digital data in a specified format such as MPEG by the control circuit 106. The MPEG digital data are then stored in the hard disc drive 101 in an editable manner. The edited digital data is then recorded into the recordable disc 15 by the disc burner 102. On the other hand, it is also possible to record the data previously stored in the disc 15 into the hard disc drive 101.

Since the digital recording/reproducing apparatus mentioned above exhibits functions of record and playback and generally has other extended uses, for example scheduled record, the operating interface for control of the digital recording/reproducing apparatus, such as a remote controller, would be quite complex. The complicated operating interface becomes hindrance from using the digital recording/reproducing apparatus, particularly for the elderly or uneducated users. Recently, a graphic-based user interface, so called as "easy guider", was developed to make the control more user-friendly. For example, when an actuating button on a remote controller is pressed down, a comprehensible guiding menu consisting of several selective items is shown on the screen. Following the instructions shown on the screen, the user can navigate functions of the digital recording/reproducing apparatus by moving the cursor to the desired operation item on a step-by-step basis.

FIGS. 3(a), 3(b), 3(c), 3(d) and 3(e) schematically show various guiding menus sequentially displayed for guiding the user to control the digital recording/reproducing apparatus to execute the recording function. In the main menu of FIG. 3(a), items of playback, record, erase and finalize are provided for user's selection. In this case that a record function is to be executed, the term "Record" is selected by moving the highlight cursor to the desired visual key 31 on the screen with the up/down buttons of the remote controller and pushing the "Enter" button under this circumstance. Then, a sub-menu of FIG. 3(b) will be shown for further selection. In this sub-menu, the video source including TV, AV1, AV2, S-Video or DV is to be selected. If the TV video source is selected by moving the highlight cursor to the desired visual key 32 on the screen with the up/down buttons of the remote controller and the "Enter" button is pushed down under this circumstance, a further menu will be shown for the user to select the channel that is to be recorded, as shown in FIG. 3(c). By pushing the channel up/down buttons, the digits in the visual key 33 will change. After the desired channel is located, push "Enter" to enter next menu, as shown in FIG. 3(d), to select the recording quality and the recording period. For example, the HQ mode offers the highest resolution with highest bit rate. However, only 1 hour of video can be recorded in this mode. The SP mode has a lower bit rate, but the video quality is still very good. The video quality with the EP and SLP isn't nearly as good, but a lot of video data can be fit onto one disc in these modes. After the user selects the desired recording period/quality, e.g. 2 hrs/SP, via the visual key 34 and then pushes "Enter", the frame as shown in FIG. 3(e) will be shown. In this menu, the recording operation is started upon the visual key 35 indicating the term "Go" is pushed.

The "easy guider" operating interface, although alleviating complexity problem by minimizing real buttons on the remote controller, is still not user-friendly enough. Since the text and graphic symbols shown on the screen is very simple, some users may have problem in realizing or memorizing the meaning of the visual keys or need to look it up in the handbook. Therefore, the operation of the easy guider needs to be further improved.

SUMMARY OF THE INVENTION

The present invention provides an auxiliary operation interface of a digital recording/reproducing apparatus to help the user well understand what he can do under the displayed easy guider menu. The present invention also suggests how to facilitate a user to operate a digital recording/reproducing apparatus.

In accordance with a first aspect of the present invention, there is provided an auxiliary operation interface of a digital recording/reproducing apparatus. The auxiliary operation interface comprises a targeting item, a switching button set, and an audio prompt generator. The targeting item is optionally triggered to have the digital recording/reproducing apparatus execute a selected function. The audio prompt generator is enabled to generate an audio prompt when the targeting item is triggered. The audio prompt generator is optionally enabled or disabled by an operation of the switching button set.

In an embodiment, the audio prompt generator includes a speech engine and an audio process engine that are independently and optionally disabled by the operation of the switching button set. The switching button set includes a button subjected to selectively enable or disable the speech engine and the audio processing engine among a first state to have both the speech engine and the audio processing engine OFF, a second state to have both the speech engine and the audio processing engine ON, a third state to have the speech engine OFF but the audio processing engine ON, and a fourth state to have the audio processing engine OFF but the engine ON.

In an embodiment, the switching button set includes at least two buttons for independently enable or disable the speech engine and the audio processing engine. Alternatively, the switching button set can include at least two buttons combined to enable or disable the speech engine and the audio processing engine.

In an embodiment, the targeting item is shown on a screen coupled to the digital recording/reproducing apparatus along with a plurality of selective items, and the selected function is entered by switching the targeting item to selectively lock one of the selective items and then triggering the targeting item. One of the selective items could be locked and the targeting item could be triggered via a remote controller in communication with the digital recording/reproducing apparatus. The switching button can be arranged on the remote controller.

In an embodiment, the audio prompt generator includes a flash memory or hard disc drive for storing a plurality of audio files. The audio prompt generator could be implemented by integrated circuits for generating the audio prompt. Preferably, the digital recording/reproducing apparatus is a DVD recorder or a DVD player.

In accordance with a second aspect of the present invention, there is provided a method for facilitating a user to operate a digital recording/reproducing apparatus. According to the method, a targeting item is triggered to execute a selected function, and a sound prompt is generated by an audio process engine when the targeting item is triggered and said audio process engine is enabled. The audio process engine is optionally enabled or disabled by an operation of said switching button set.

In an embodiment, the method can further include a step to generate a speech prompt by a speech engine when the targeting item is triggered and the speech engine is enabled. The speech engine is optionally enabled or disabled by an operation of said switching button set.

In an embodiment, the switching button set includes a button subjected to selectively enable or disable the speech engine and the audio processing engine among a first state to have both the speech engine and the audio processing engine OFF, a second state to have both the speech engine and the audio processing engine ON, a third state to have the speech engine OFF but the audio processing engine ON, and a fourth state to have the audio processing engine OFF but the engine ON.

In an embodiment, the switching button set includes at least two buttons for independently enable or disable the speech engine and the audio processing engine. Alternatively, the switching button set can include at least two buttons combined to enable or disable the speech engine and the audio processing engine.

In accordance with a third aspect of the present invention, there is provided a method for facilitating a user to operate a digital recording/reproducing apparatus. According to the method, a targeting item is triggered to execute a selected function, and a speech prompt is generated by an speech engine when the targeting item is triggered and said speech engine is enabled. The speech engine is optionally enabled or disabled by an operation of said switching button set.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
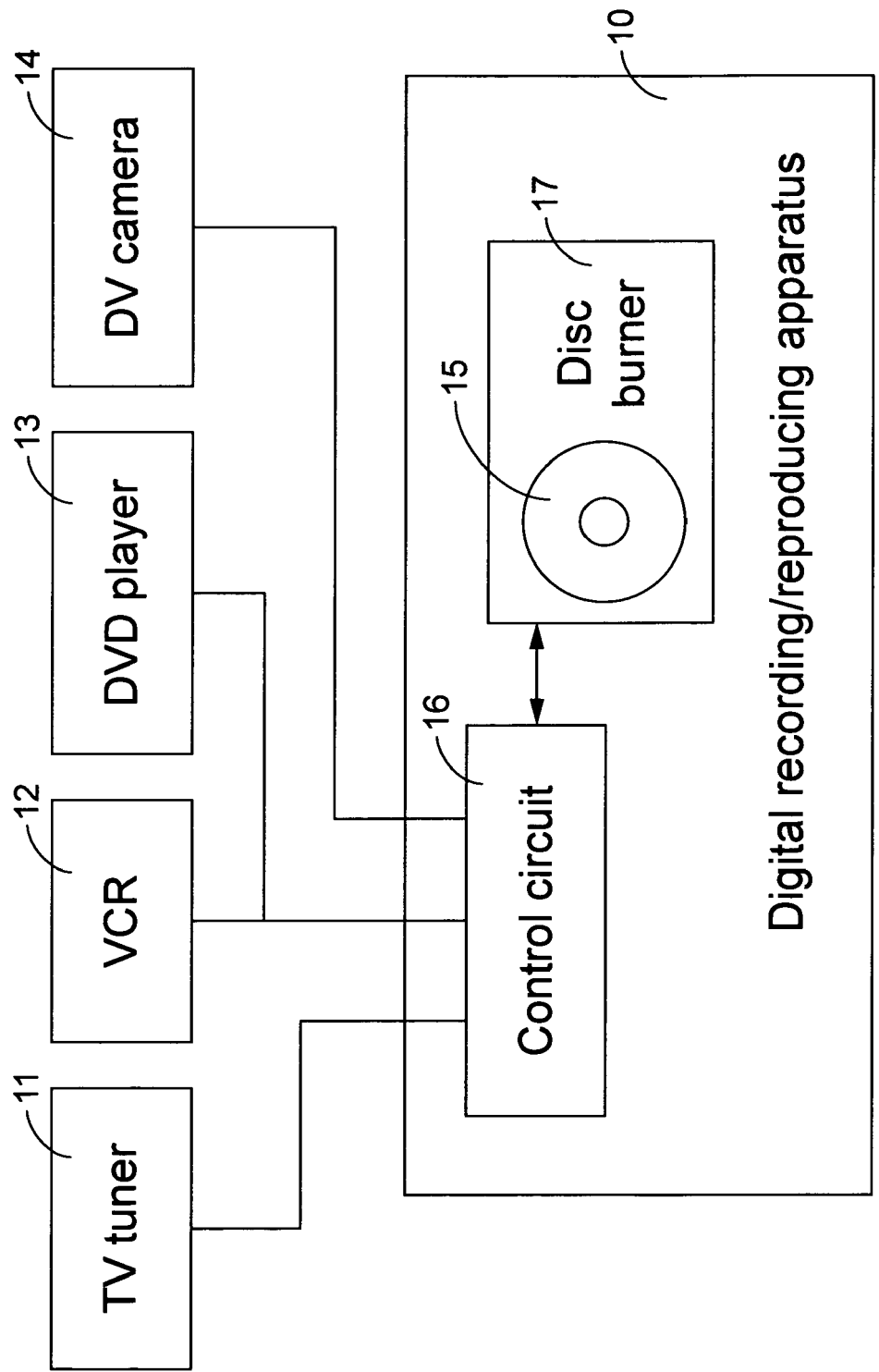
FIG. 1 is a functional block diagram illustrating the use of a conventional digital recording/reproducing apparatus with a plurality of external data sources.
Figure 2:
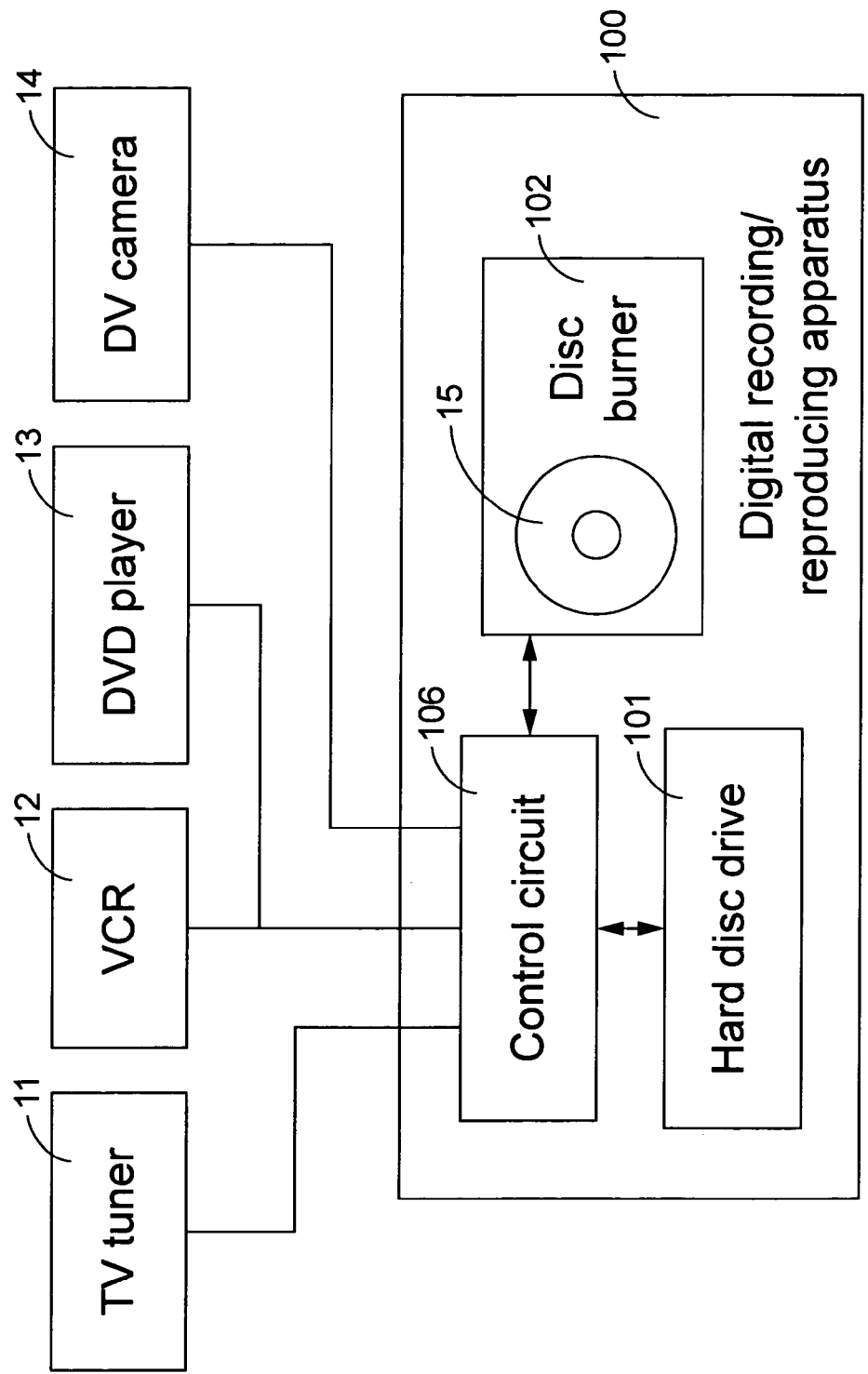
FIG. 2 is a functional block diagram illustrating the use of another conventional digital recording/reproducing apparatus with a plurality of external data sources.
Figure 3B:
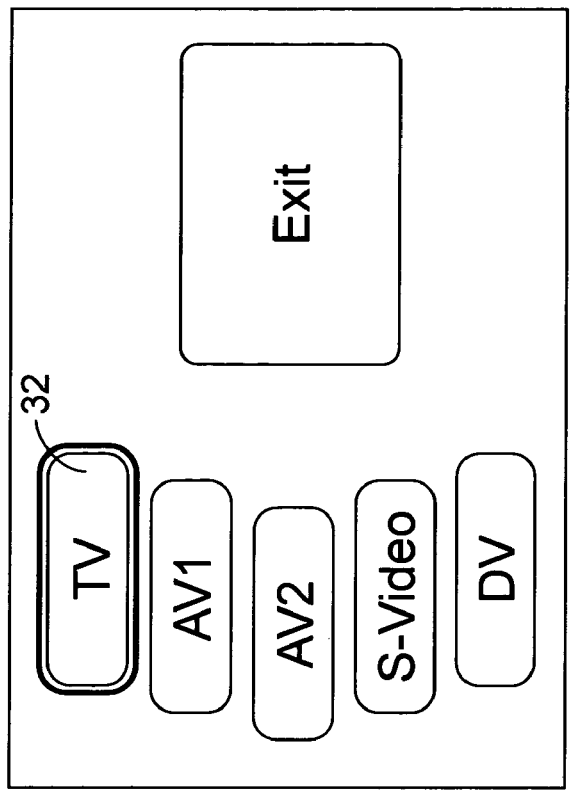
FIGS. 3(a), 3(b), 3(c), 3(d) and 3(e) are schematic diagrams showing a series of easy guider menu for executing a recording operation.
Figure 3A:
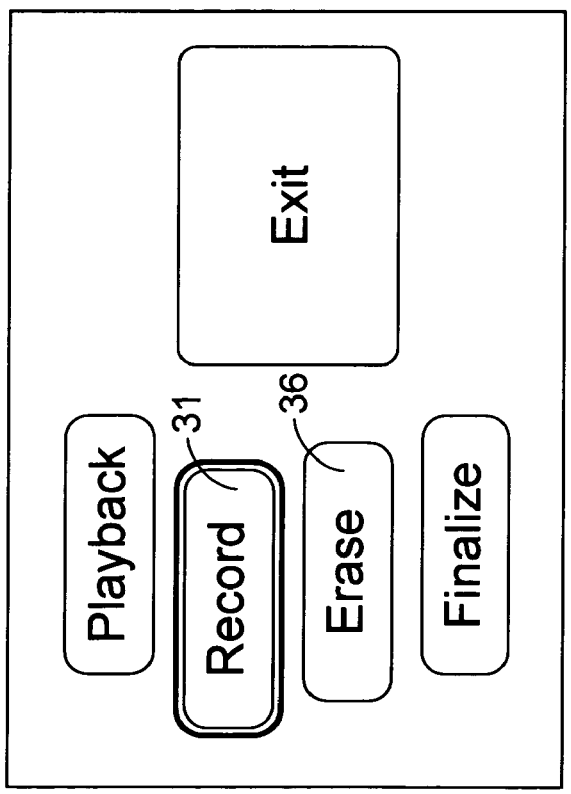
Figure 3D:
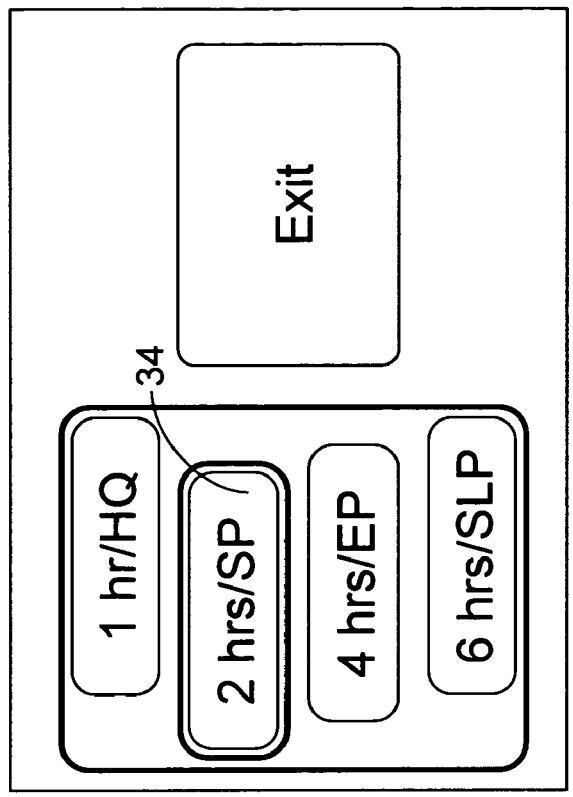
Figure 3C:
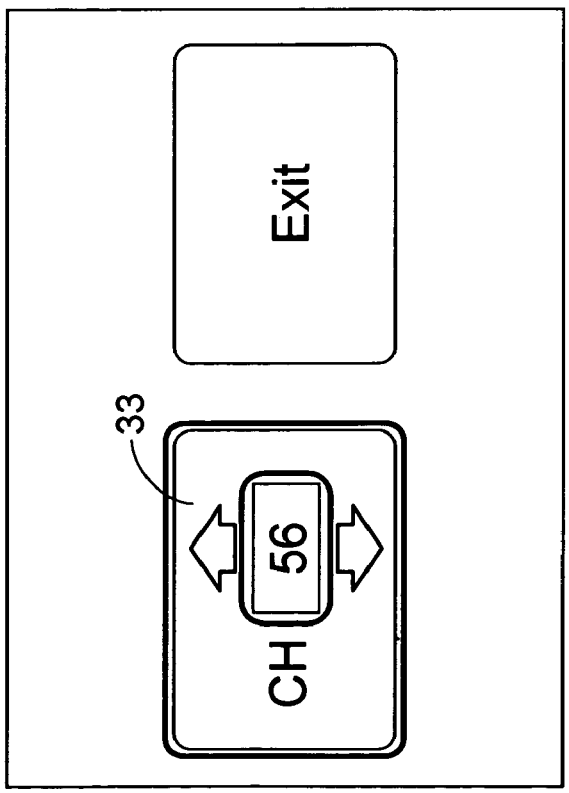
Figure 3E:
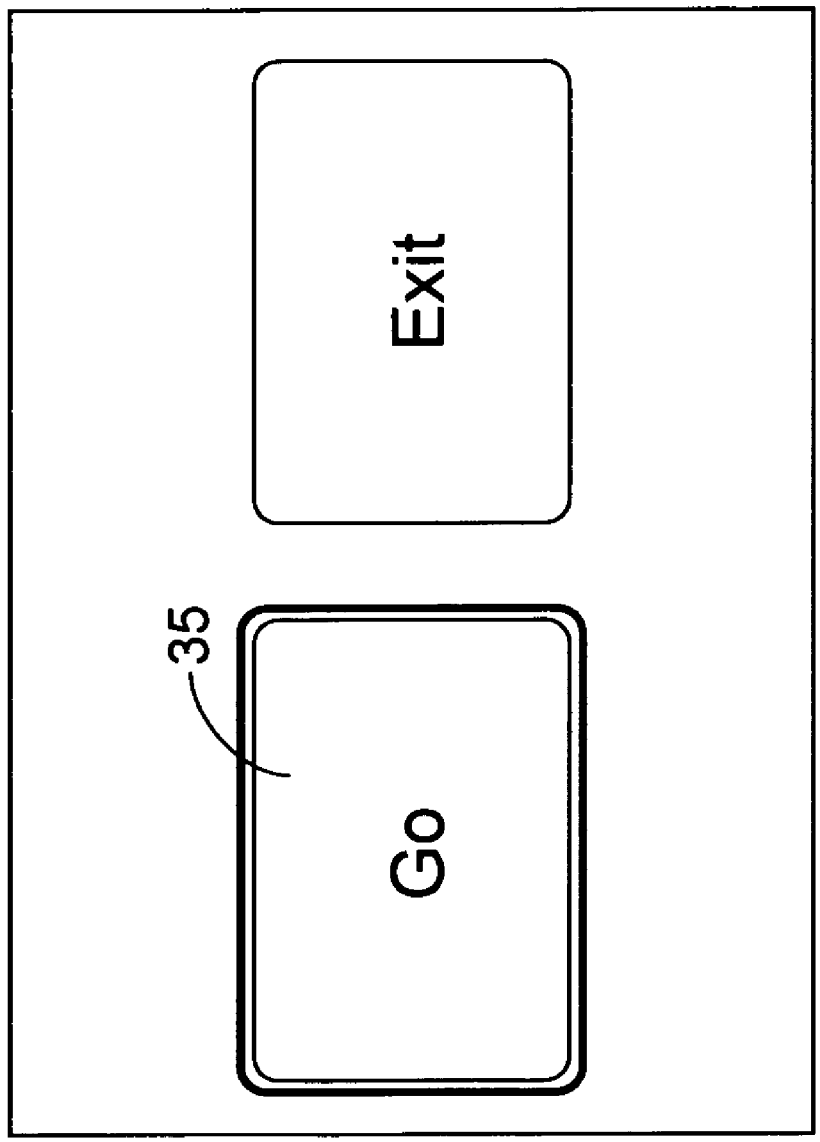
Figure 4:
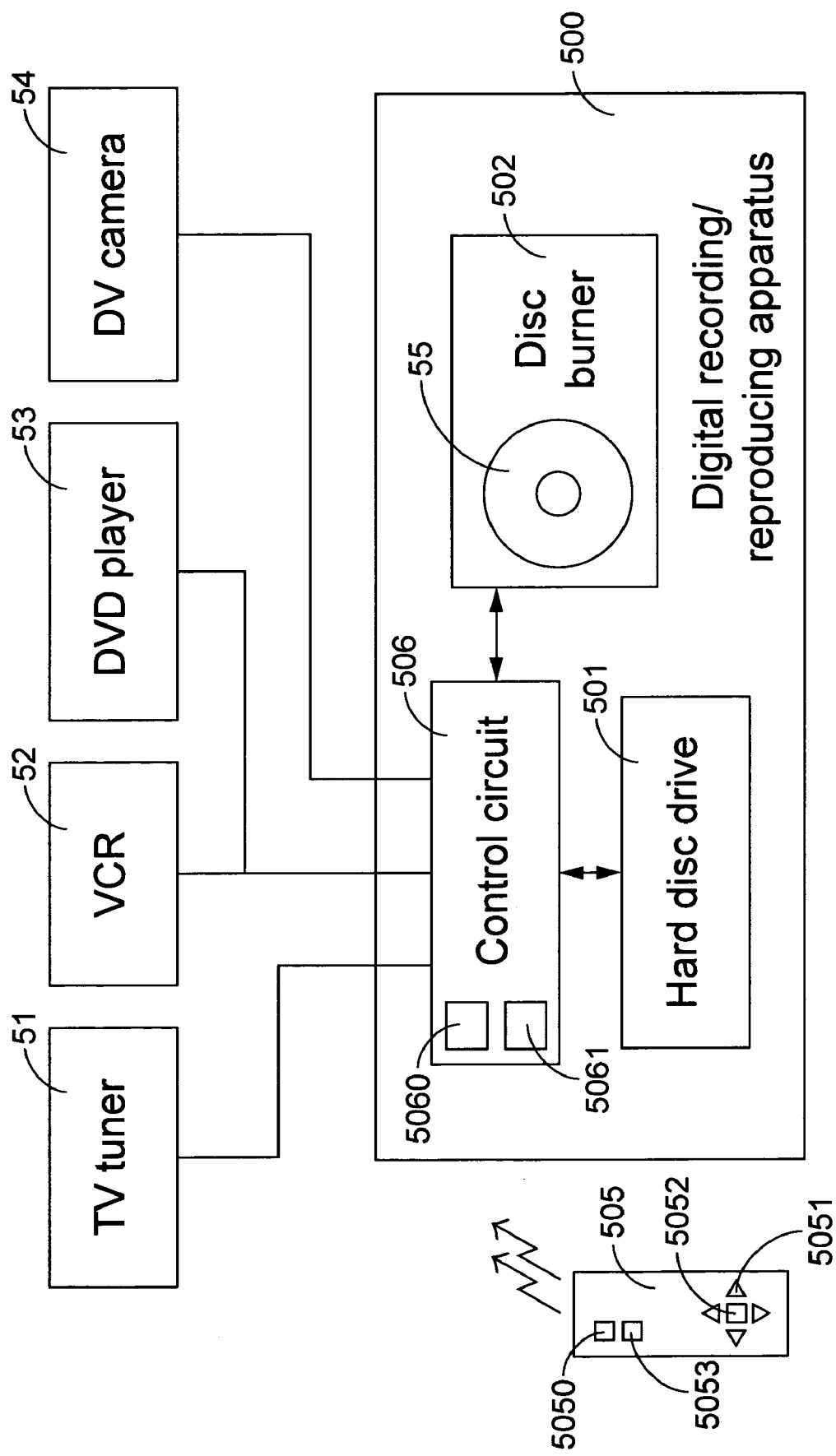
FIG. 4 is a functional block diagram illustrating a digital recording/reproducing apparatus using an auxiliary operation interface according to a preferred embodiment of the present invention.

Hereinafter, an embodiment of an auxiliary operation interface and the operation of the auxiliary operation interface for facilitating a user to operate a digital recording/reproducing apparatus according to the present invention will be illustrated with reference to FIG. 4 and FIG. 5.

The auxiliary operation interface is used with a digital recording/reproducing apparatus 500 that comprises a disc burner 502, a control circuit 506 and a digital data storage device such as a hard disc drive 501. For recording data from an external source to a disc, the data signals received from the TV tuner 51, the VCR 52, the DVD player 53 or the DV camera 54 are firstly converted into digital data in a specified format such as MPEG by the control circuit 506. The MPEG digital data are then stored in the hard disc drive 501 in an editable manner. Afterwards, the edited digital data can be recorded into the recordable disc 55 by the disc burner 502. On the other hand, it is also possible to record the data previously stored in the disc 55 into the hard disc 501. The auxiliary operation interface includes a guiding menu shown on a screen such as those shown in FIGS. 3(a)~3(e), a remote controller 505 in wireless communication with the digital recording/reproducing apparatus 500 for cooperating with the guiding menu, and an audio prompt generator implemented by integrated circuits consisting of an audio process engine 5060 and a speech engine 5061 disposed in the control circuit 506 of the digital recording/reproducing apparatus 500. The audio and/or speech prompts generated by the audio prompt generator help the user clearly understand what procedure is proceeding and how to make selection. Each of the audio process engine 5060 and the speech engine 5061 can be implemented with a flash memory or hard disc drive storing a plurality of audio files.

Figure 5:
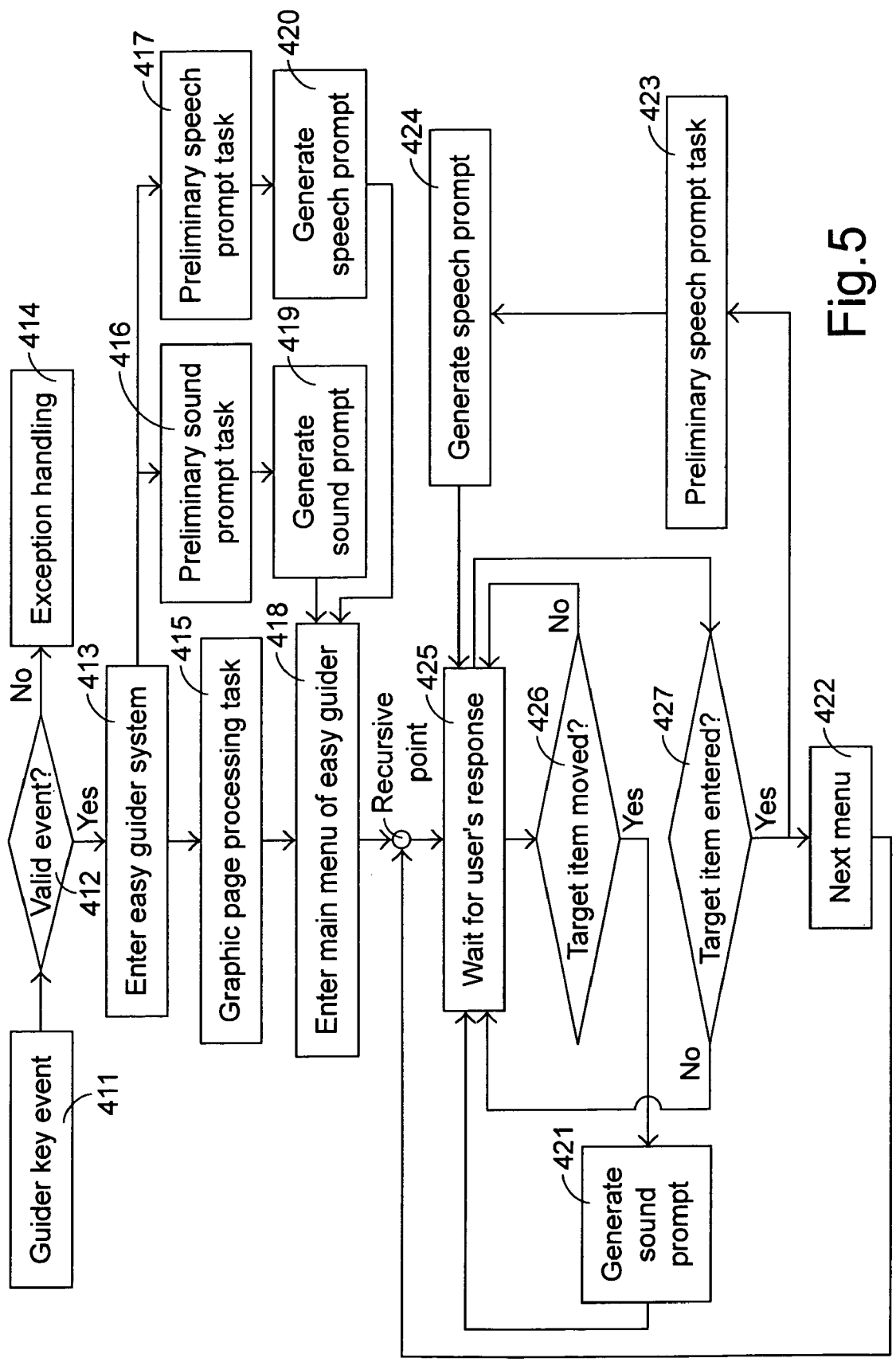
FIG. 5 is a flowchart illustrating the operation of the auxiliary operation interface for facilitating a user to operate the digital recording/reproducing apparatus according to the present invention.

First of all, referring to the flowchart of FIG. 5, by pushing an actuating button 5050 of the remote controller 505, a guider key event occurs (Step 411). If the guider key event is checked by the control circuit 506 and determined to be valid (Step 412), an easy guider system operation procedure is entered (Step 413). Otherwise, the guider key event is invalid and processed by an exception handling procedure (Step 414). In the system operation procedure, a graphic page processing task (Step 415), a preliminary sound prompt task (Step 416) and a preliminary speech prompt task (Step 417) are executed. After the graphic page processing task is performed, a main menu of the easy guider exemplified in FIG. 3(*a*) as a guiding menu is entered (Step 418) and displayed on the screen (not shown) coupled to the digital recording/reproducing apparatus 500. There are a plurality of selective items, e.g. playback, record, erase and finalize, included in the guiding menu. Meanwhile, the preliminary sound prompt task and preliminary speech prompt task are executed with an application program to locate pre-stored sound and speech data corresponding to the main menu and associated selective items according to respective identifying codes. Then, the located sound and speech data are processed into associated sound and speech prompts by the audio process engine 5060 and the speech engine 5061, respectively (Step 419 and Step 420). In a specific example, while entering the main menu, a speech prompt is outputted for describing the options of user through the main menu. Then, the user can make his selection. When the up/down/left/right selection buttons 5051 of the remote controller 505 are selectively manipulated to lock one of the selective items as a targeting item, a sound prompt is outputted to notify the switching of the targeting item (Step 421). For example, when the user triggers the "up" button of the remote controller 505 to switch the targeting item from the "Erase" key 36 into the "Record" key 31 as currently shown in FIG. 3(*a*), a sound prompt is outputted simultaneously. Optionally, a speech prompt can also be outputted to repeat the word "Record" or describe what the record key means and/or how it works, depending on the manufacturer's design. By pushing the "Enter" button 5052 of the remote controller 505, the targeting item "Record" is entered. Then, next menu is shown on the screen as another guiding menu (Step 422), e.g. that shown in FIG. 3(*b*). Meanwhile, a preliminary speech prompt task is executed (Step 423) and a speech prompt for describing the currently displayed menu is generated (Step 424). Likewise, the user can make his further selection through this menu (Steps 425, 426, 427) with the aid of audio and/or speech prompts (Step 421) and trigger another targeting item to enter next menu (Step 422) with the speech prompt describing the next menu for further selection (Steps 423, 424).

An example that a record function is to be executed is used herein to help with the understanding of the auxiliary operation interface according to the present invention. After the main menu of the easy guider system is entered, the highlight cursor should be moved to the desired visual key 31 as shown in the main menu of FIG. 3(*a*) with the selection button 5051 to lock the item "Record" as the targeting item. During the above procedure, the audio process engine 5060 generates a sound prompt whenever the targeting item changes, i.e. the highlighted cursor changes. Once the item "Record" is locked, the "Enter" button 5052 of the remote controller 505 is pressed down so that the recording function is selected. Then, the sub-menu of FIG. 3(*b*) is shown for further selection, and the speech engine 5061 generate a speech prompt associated with the contents of this menu. For example, the speech prompt can be "For recording, please select a video source among TV, AV1, AV2, S-Video and DV". Of course, the speech prompt can be any other language that is available from the pre-stored speech data file or can be downloaded from the Internet. Preferably, a language selection key (not shown) is arranged in the guiding menu and/or a language selection button (not shown) is disposed in the remote controller to achieve this purpose. If the TV video source is selected as the targeting item by moving the highlight cursor to the desired visual key 32 on the screen with the up/down selection button 5051 and entered by pushing the "Enter" button 5052 of the remote controller 505, a further menu will be shown for the user to select the channel that is to be recorded, as shown in FIG. 3(*c*). Meanwhile, the speech engine 5061 will generate a speech prompt, for example "For recording, please select a TV channel as the video source". By pushing the channel up/down buttons, the digits in the visual key 33 will change. After the desired channel is located, push "Enter" to enter next menu, as shown in FIG. 3(*d*). Meanwhile, the speech engine 5061 will generate a speech prompt, for example "For recording, please select the recording quality and the recording period". After the user selects the desired recording period/quality, e.g. 2 hrs/SP, via the visual key 34 and then pushes the "Enter" button of the remote controller, the frame as shown in FIG. 3(*e*) will be shown. Meanwhile, the speech engine 5061 will generate a speech prompt, for example "For recording, please press Go to start". After the user pushes the "Enter" button of the remote controller, the record operation starts.

Figure 7:
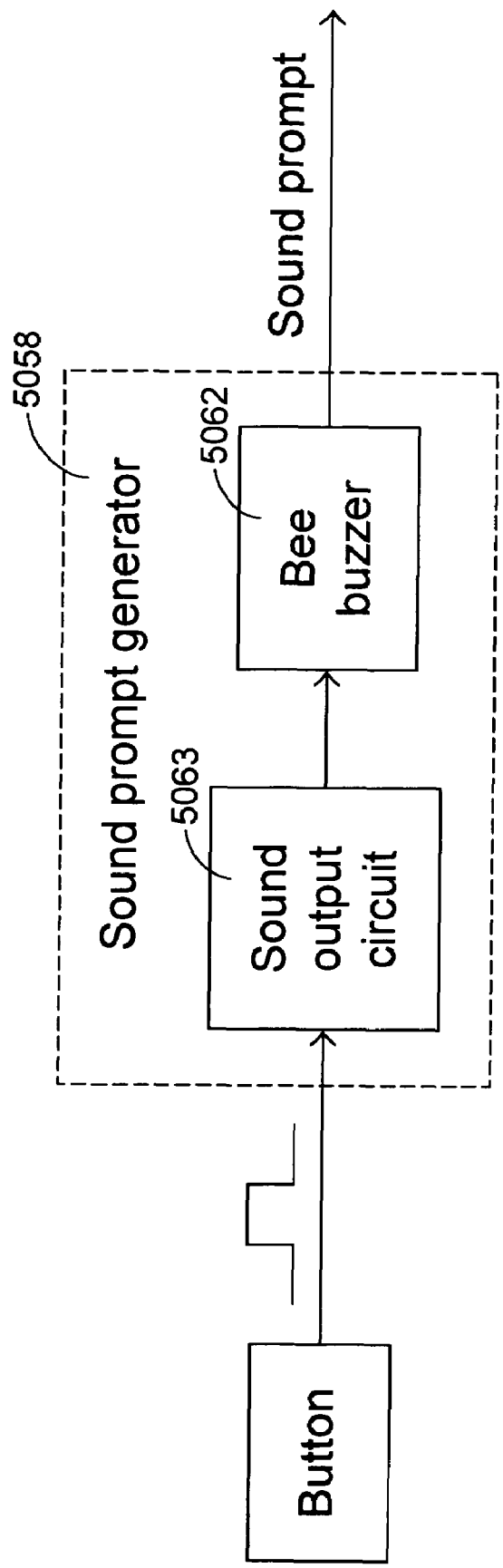
FIG. 7 is a functional block diagram illustrating a remote controller for use with a digital recording/reproducing apparatus, which has the function of generating a sound prompt according to the present invention.

Moreover, an audio prompt can be generated when the digital recording/reproducing apparatus is powered on to indicate the current status of the recording/reproducing apparatus. Ideally, the shift of the targeting item and the switching of the guiding menu are revealed on the display immediately upon the corresponding buttons of the remote controller are pushed. Sometimes, however, the frame change on the screen is not as quick as expected so that whether the button of the remote controller is successfully triggered cannot be confirmed. Therefore, in addition to the sound and/or speech prompts generated by the audio process engine 5060 and/or speech engine 5061 when the digital recording/reproducing apparatus 500 is powered on and whenever the shift of the targeting item and the switching of the guiding menu are executed, as shown in FIG. 5, it is preferred that sound prompts can also be emitted in response to the effective triggering of the button of the remote controller. For confirming that the triggering of the button is effective, the remote controller 505 according to the present invention further comprises a sound prompt generator 5058 (see FIG. 7). When any button of the remote controller 505 is pressed down, a triggering signal is transmitted to the sound prompt generator 5058. In response to the triggering signal, the sound prompt generator 5058 generates a sound prompt to acknowledge the triggering of that button. The sound prompt generator 5058 may comprise a loudspeaker or bee buzzer 5062 to achieve this purpose. Depending on the manufacturer's design, the sound prompt generator 5058 can further comprise a sound output circuit 5063 to generate sound prompts varying with different triggering signals. For example, in response to the triggering signals from a functional button and from a numerical button, the sound prompts emitted from the loudspeaker or bee buzzer are distinguishable. Of course, the sound prompts can also be replaced with speech prompts, depending on manufacturer's design.

The above-mentioned sound prompts and the speech prompts, no matter if it is generated by the prompt generator in the digital recording/reproducing apparatus 500 or the remote controller 505, may be selected from several preset audio files. Alternatively, the audio files can be downloaded from a designated website via the Internet. For example, the audio files include speech prompts of different languages.

Figure 6A:
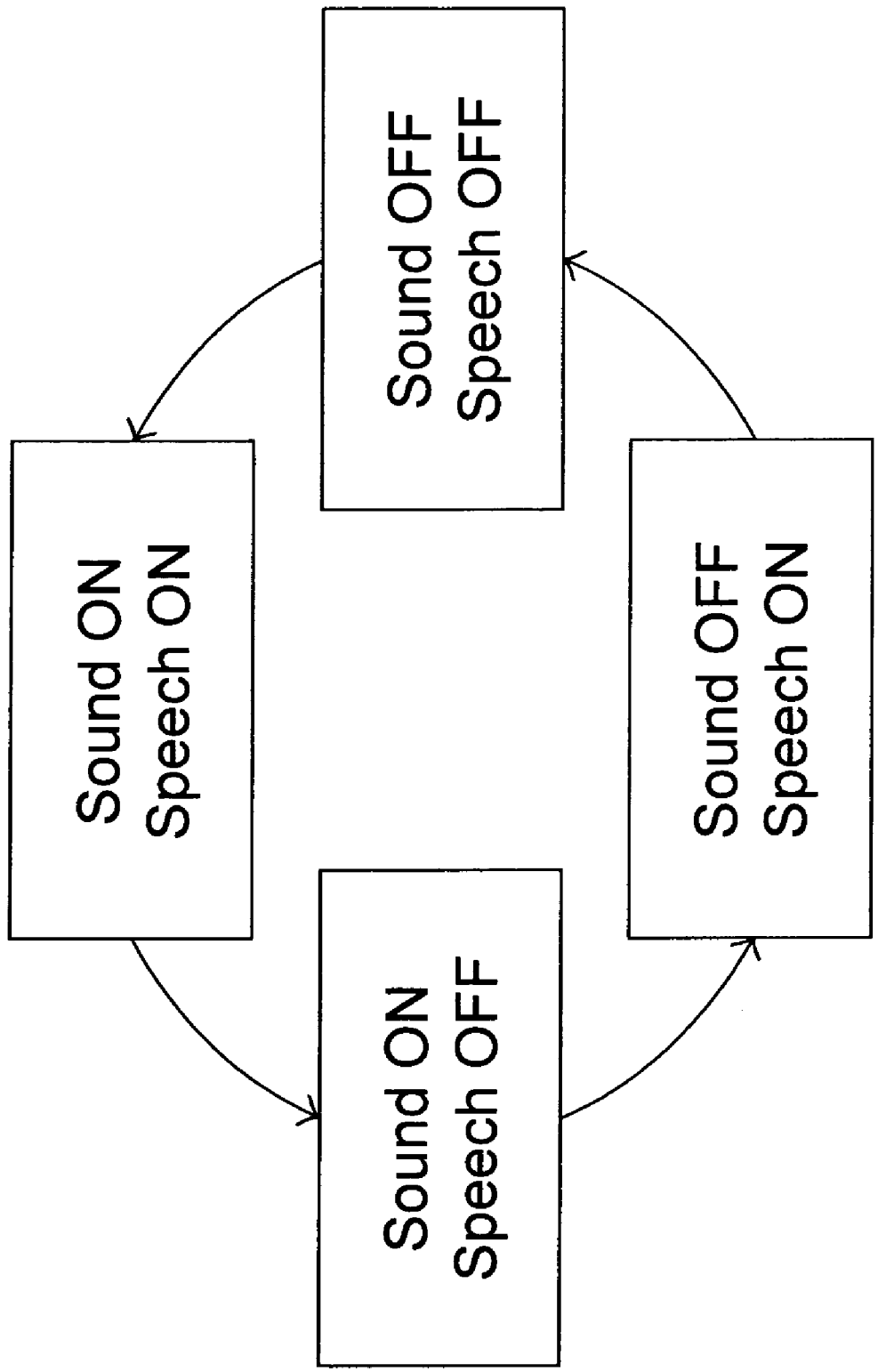
FIG. 6(a) is a functional block diagram illustrating the sequence of selectively enabling or disabling the sound effect and speech effect with a single push button according to the present invention.
Figure 6C:
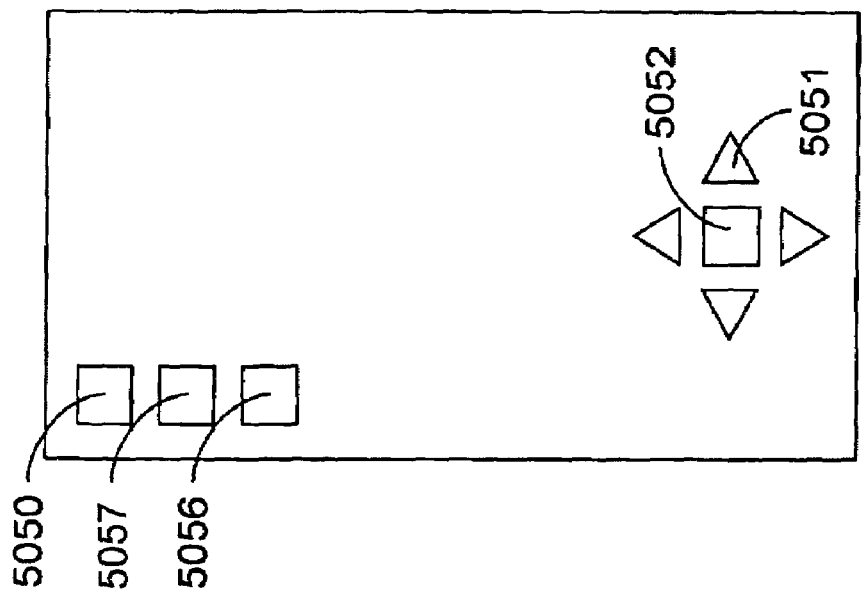
FIG. 6(c) is a front view illustrating a remote controller for selectively enabling or disabling the sound effect and speech effect by pushing respective exclusive buttons.
Figure 6B:
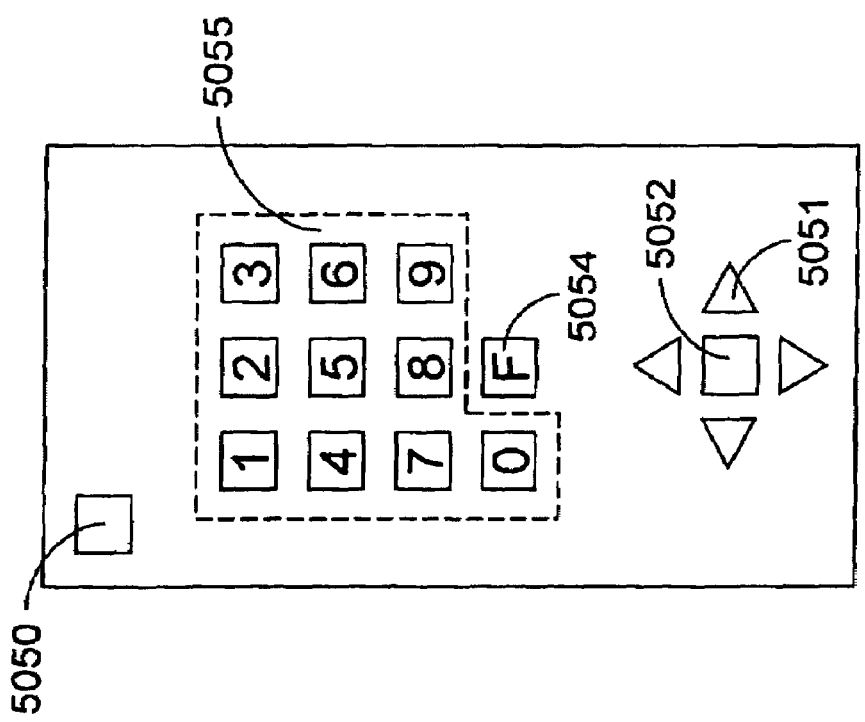
FIG. 6(b) is a front view illustrating a remote controller for selectively enabling or disabling the sound effect and speech effect by pushing a combination of at least two buttons.

It is understood from the above description that the auxiliary operation interface capable of generating audio prompts according to the present invention facilitates the operation of the digital recording/reproducing apparatus. Nevertheless, the audio prompt function can be shut off when it is not necessary any more and restored at any time. Via the speech/sound prompt switching button 5053 of the remote controller, the audio process engine 5060 and the speech engine 5061 that respectively generate sound prompts and speech prompts can be selectively and independently enabled and/or disabled for example according to the sequence shown in FIG. 6(*a*). In this example, the audio process engine 5060 and the speech engine 5061 are both enabled upon the actuating button 5050 of the remote controller 505 is pressed down to trigger a guider key event, i.e. upon the easy guider is entered. Once the switching button 5053 is pressed down, the speech engine 5061 is disabled but the audio process engine 5060 remains enabled. One more push of the switching button 5053 disables the audio process engine 5060 but enables the speech engine 5061. Subsequently, once the switching button 5053 is pressed down again, the audio process engine 5060 and the speech engine 5061 are both disabled. The switching cycle will be repeated by repetitively triggering the switching button 5053. Instead of using the single switching button 5053 to switch phases as described above, the similar selectively enabling and/or disabling functions can also be practiced by pushing a combination of buttons, each single one of which has been programmed for another function. For example, as shown in FIG. 6(*b*), a user may push a functional button 5054 and one of four designated numerical buttons 5055 as a combination to differentially enable and/or disable the sound/speech prompts. Alternatively, the similar selectively enabling and/or disabling functions can be practiced by pushing respective exclusive buttons. For example, as shown in FIG.6(*c*), the single switching button 5053 of the remote controller 505 can be replaced by a sound prompt switching button 5057 and a speech prompt switching button 5056 for selectively enabling or disabling the sound effect and speech effect.

From the above description, the auxiliary operation interface of the present invention is advantageous for facilitating a user to operate a digital recording/reproducing apparatus with the aid of the sound/speech prompts. Furthermore, the audio prompt function can be enabled and/or disabled as required, thereby increasing application flexibility of such an auxiliary operation interface.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An auxiliary operation interface of a digital recording/reproducing apparatus, comprising:
    a targeting item optionally triggered to have said digital recording/reproducing apparatus execute a selected function;
    a switching button set; and
    an audio prompt generator enabled to generate an audio prompt when said targeting item is triggered;
    wherein said audio prompt geneator comprises a speech engine and an audio process engine that are indpndently and optionally enabled or disabled by an opration of said switching button set;
    wherein said switching button set includes a button subjected to selectively enable or disable said speech engine and said audio process engine among a first state to have both said speech engine and said audio process engine OFF, a second state to have both said speech engine and said audio process engine ON, a third state to have said speech engine OFF but said audio process engine ON, and a fourth state to have said audio process engine OFF but said speech engine ON.

2. The auxiliary operation interface according to claim 1 wherein said switching button set includes two buttons for independently enable or disable said speech engine and said audio process engine.

3. The auxiliary operation interface according to claim 1 wherein said switching button set includes at least two buttons combined to enable or disable said speech engine and said audio process engine.

4. The auxiliary operation interface according to claim 1 wherein said targeting item is shown on a screen coupled to said digital recording/reproducing apparatus along with a plurality of selective items, and said selected function is entered by switching said targeting item to selectively lock one of said selective items and triggering said targeting item.

5. The auxiliary operation interface according to claim 4 wherein one of said selective items is locked and said targeting item is triggered via a remote controller in communication with said digital recording/reproducing apparatus.

6. The auxiliary operation interface according to claim 5 wherein said switching button set is affanged on said remote controller.

7. The auxiliary operation interface according to claim 1 wherein said audio prompt generator includes a flash memory or hard disc drive for storing a plurality of audio files.

8. The auxiliary operation interface according to claim 1 wherein said audio prompt generator is implemented by integrated circuits for generating said audio prompt.

9. The auxiliary operation interface according to claim 1 wherein said digital recording/reproducing apparatus is a DVD recorder or a DVD player.

10. A method for facilitating a user to operate a digital recording/reproducing apparatus, said method comprising steps of:
    triggering a targeting item to execute a selected function; and
    generating a sound prompt by an audio process engine when said targeting item is triggered and said audio process engine is enabled;
    wherein said audio process engine is optionally enabled or disabled by an operation of a switching button set;
    generating a speech prompt by a speech engine when said targeting item is triggered and said speech engine is enabled;
    wherein said speech engine is optionally enabled or disabled by said operation of said switching button set;
    wherein said switching button set includes a button subjected to selectively enable or disable said speech engine and said audio process engine among a first state to have both said speech engine and said audio process engine OFF, a second state to have both said speech engine and said audio process engine ON, a third state to have said speech engine OFF but said audio process engine ON, and a fourth state to have said audio process engine OFF but said speech engine ON.

11. The method according to claim 10 wherein said switching button set includes two buttons for independently enable or disable said speech engine and said audio process engine.

12. The method according to claim 10 wherein said switching button set includes at least two buttons combined to enable or disable said speech engine and said audio process engine.

13. The method according to claim 10 wherein said switching button set includes a button subjected to selectively enable or disable said audio processing engine.

* * * * *

UNITED STATES PATENT AND TRADEMARK OFFICE
CERTIFICATE OF CORRECTION

PATENT NO. : 7,480,865 B2  Page 1 of 1
APPLICATION NO. : 11/254978
DATED : January 20, 2009
INVENTOR(S) : Chia-Hsiang Lin It is certified that error appears in the above-identified patent and that said Letters Patent is hereby corrected as shown below:

In column 8, line 1, please delete "geneator" and replace it with --generator--;
In column 8, line 2, please delete "indpndently" and replace with --independently--;
In column 8, line 3, please delete "opration" and replace it with --operation--;
In column 8, line 36, please delete "affanged" and replace it with --arranged--.

Signed and Sealed this

Fourteenth Day of September, 2010

David J. Kappos
*Director of the United States Patent and Trademark Office*